United States Patent [19]

Miller

[11] Patent Number: 4,668,300
[45] Date of Patent: May 26, 1987

[54] PREPARATION OF CEMENT USING STABILIZED FIBERS OF METASTABLE CALCIUM SILICATE

[76] Inventor: Jorge Miller, Calle 22, Letra C, N° 30-49, Bogota, Colombia

[21] Appl. No.: 780,909

[22] Filed: Sep. 27, 1985

Related U.S. Application Data

[63] Continuation-in-part of Ser. No. 538,998, Oct. 4, 1983, abandoned.

[51] Int. Cl.$^4$ ............ C01B 33/24; C04B 14/00; C04B 14/38
[52] U.S. Cl. .................... 106/314; 106/100; 264/8; 264/12; 423/331
[58] Field of Search ............ 264/8, 12; 423/331; 106/314, 100

[56] References Cited

U.S. PATENT DOCUMENTS

| | | | |
|---|---|---|---|
| 757,035 | 4/1904 | Gramm | 65/15 |
| 3,985,935 | 10/1976 | Bondmann | 428/401 |
| 4,095,989 | 6/1978 | Dosch et al. | 106/314 |
| 4,512,809 | 4/1985 | Nielsen et al. | 106/100 |

FOREIGN PATENT DOCUMENTS 51-53022  5/1976  Japan .................... 264/8

OTHER PUBLICATIONS

Thoenen, Bureau of Mines Information Circular 6984 R, Jun. 1939, pp. 1–49.

Primary Examiner—Howard S. Williams
Attorney, Agent, or Firm—Berman, Aisenberg & Platt

[57] ABSTRACT

A molten reaction product of calcium oxide, silica and aluminum is quickly quenched from a temperature clearly in excess of the $\alpha'$-$\alpha$ inversion in a manner which simultaneously forms stabilized B-phase dicalcium silicate fibers having diameters which do not exceed 15 microns. These fibers are milled into smaller particles which are particularly useful for producing high-strength cement which does not require activation with lime.

12 Claims, 2 Drawing Figures

PREPARATION OF CEMENT USING STABILIZED FIBERS OF METASTABLE CALCIUM SILICATE

RELATED APPLICATION

This application is a continuation-in-part of Ser. No. 538,998, filed 10-4-83 now abandoned.

TECHNICAL FIELD

The application is directed to the preparation of calcium silicates and aluminates in a fibrous form which is particularly useful for producing high-strength cements. The fibers produced according to this invention contain dicalcium silicate in virtually entirely $\beta$-phase crystalline form.

BACKGROUND

Four mineral constituents: $C_3S$ (tricalcium silicate), $C_2S$ (dicalcium silicate), $C_3A$ (tricalcium aluminate) and $C_4AF$ (tetracalcium alumina ferrite), constitute the major part of cement. Their relative amounts and form of crystallization govern such properties as strength and durability. For instance, at room temperaure, $C_2S$ is thermodynamically stable in the $\gamma$-form; yet this form is not desirable in cement since it hydrates into tobermorites (which gives strength to cement) only with difficulty.

A study of powder diagrams of the $\alpha'$-, $\alpha$-, $\beta$- and $\gamma$-forms of $C_2S$ reveals that fineness of particle size is critical to stability. The $\alpha'$-phase is always transformed during cooling into the $\beta$-phase. When $\beta$ grains are smaller than a particular critical size [in the order of $(5\mu)^3$], the probability that such grains contain a $\gamma$ nucleus is very slight; thus, metastable $\beta$ phase can be preserved at ordinary temperatures. On the other hand, when grains are large [e.g. $(30\mu)^3$], a $\gamma$ nucleus is always present. Such nucleus grows until all of the $\beta$ phase is turned into non-reactive $\gamma$ phase, which yields only a weak cement.

Criticality of particle size and quenching is discussed in "CHEMISTRY OF CEMENT Proceeding of the Fourth International Symposium, Washington, 1960", Monograph 43, Volume 1, pages 21 and 389, U.S. Department of Commerce, National Bureau of Standards.

Means and methods for preparing "mineral wools" (e.g., mineral, rock and glass whole) are well known. These wools differ greatly from the present fibers, however. Mineral, rock and glass wools are amorphous, super-cooled liquids and generally devoid of crystals. U.S. Pat. No. 3,360,593 (Rau et al.) teaches that mineral wools containing "property-destroying" crystal nuclei are undesirable. Rau's invention relates to a process for avoiding crystal formation in blown material fibers. U.S. Pat. No. 2,051,279 (Thorndyke) relates to the preparation of "flexible and highly resilient" glass and mineral fibers; no teaching of fibers containing $\beta$-phase crystals of $C_2S$ is found, U.S. Pat. No. 3,985,913 (Brodmann) also relates to the production of vitreous fibers. Although "mineral wools" are useful cement components, they alone cannot be hydrated to form cement; activators (e.g. lime) must first be added.

Quenching with high-pressure steam or air streams is common in the mineral wool industry. J. R. Thoenen (*Mineral Wool*, Bureau of Mines Information Circular No. 6984R, 1939) reported on twenty-five mineral wool plants, a majority of which employed steam to quench a molten slag stream. Because the present process produces cement, steam or even normal air cannot be used as these cause premature hydration and thus yield a useless product.

Prior attempts to manufacture cement in blast and rockwool furnaces have not been successful. The highly basic molten slag causes refractory linings to melt away as the linings react with excess calcium in the slag. Rockwool furnaces produce fibers which are too large and thus contain $C_2S$ wholly in unreactive $\gamma$ form. Further, the resulting product is prematurely hydrated even at the extremely low reactive humidity of the furnace.

SUMMARY OF THE INVENTION

The invention actually has a number of different aspects. It relates to a nove process for reacting (in the liquid phase) calcium oxide, silica and alumina to form calcium silicates and aluminates and dispersing the resulting liquefied compounds with simultaneous quenching to retain specific characteristic which enable these compounds (upon hydration) to form high-strength cements. The means to produce the required dispersing and simultaneous quenching are a further aspect of this invention, as is the physical form of the calcium silicate actually produced by exemplified (dispersing and quenching) means.

The method is that of producing a cement component which does not require activation with lime. It comprises (a) quenching a liquid-phase reaction product of calcium oxide, silica and alumina from a temperature in excess of 1,500° C. (more specifically 1,600° C. or preferably 1,660° C.) to a temperature of less than 400° C. and preferably less than 300° C. and (b) simultaneously forming the reaction product into fibers having diameters which do not exceed 15 microns. [Crystal size within such fibers (having diameters which do not exceed 15 microns) does not exceed and is ordinarily less than 5 microns due to strain within the resulting quenched fibers.] By following this process, obtained dicalcium silicate is in a stabilized $\beta$ phase. The quenching is advantageously effected under dry conditions. One method of quenching involves passing a supersonic jet of dry air through a free-falling stream of the liquid-phase reaction product. An alternative method comprises directing a free-falling stream of the liquid-phase reaction product (in a dry atmosphere) onto a rotating surface which may be either flat or conical in shape. The slant of any conical rotating surface should be no more than 15 degrees.

When a stream of melt is directed onto a rotating surface, such surface should have a diameter which is from 10 to 20 times that of the free-falling stream. A suitable rotating surface has a peripheral velocity of from 1300 to 3800 feet per second.

Apparatus to produce the required melt, to form it into a suitable stream and to quench and disperse such stream simultaneously in order to form stabilized $\beta$-phase fibers is merely another aspect of this invention.

One purpose of this invention is to provide a system to fuse required minerals together (in a vertical continuous furnace) without fine grinding, obtaining a liquid product, dispersing such product (e.g. with a rotating surface or a dry air jet in a dry atmosphere to prevent premature hydration) into fibers which do not exceed 15 microns in diameter, disintegrating the fibers into fine powder, to which gypsum may be added to produce high-strength cement. (Previous cement-making processes require fine milling of the raw materials, sintering the mixture, fine grinding of formed clinker and activation with lime.)

Another purpose of this invention is to eliminate fine grinding, which entails a large portion of the capital and operating costs of cement production. A still further purpose is to provide a better heat-transfer system to effect fuel economy and to prevent dust pollution.

A further purpose of this invention is to eliminate the use of refractories in the fusion process.

Yet another purpose of this invention is to manufacture a cement which does not require activation with lime.

DETAILS

Figure 1:
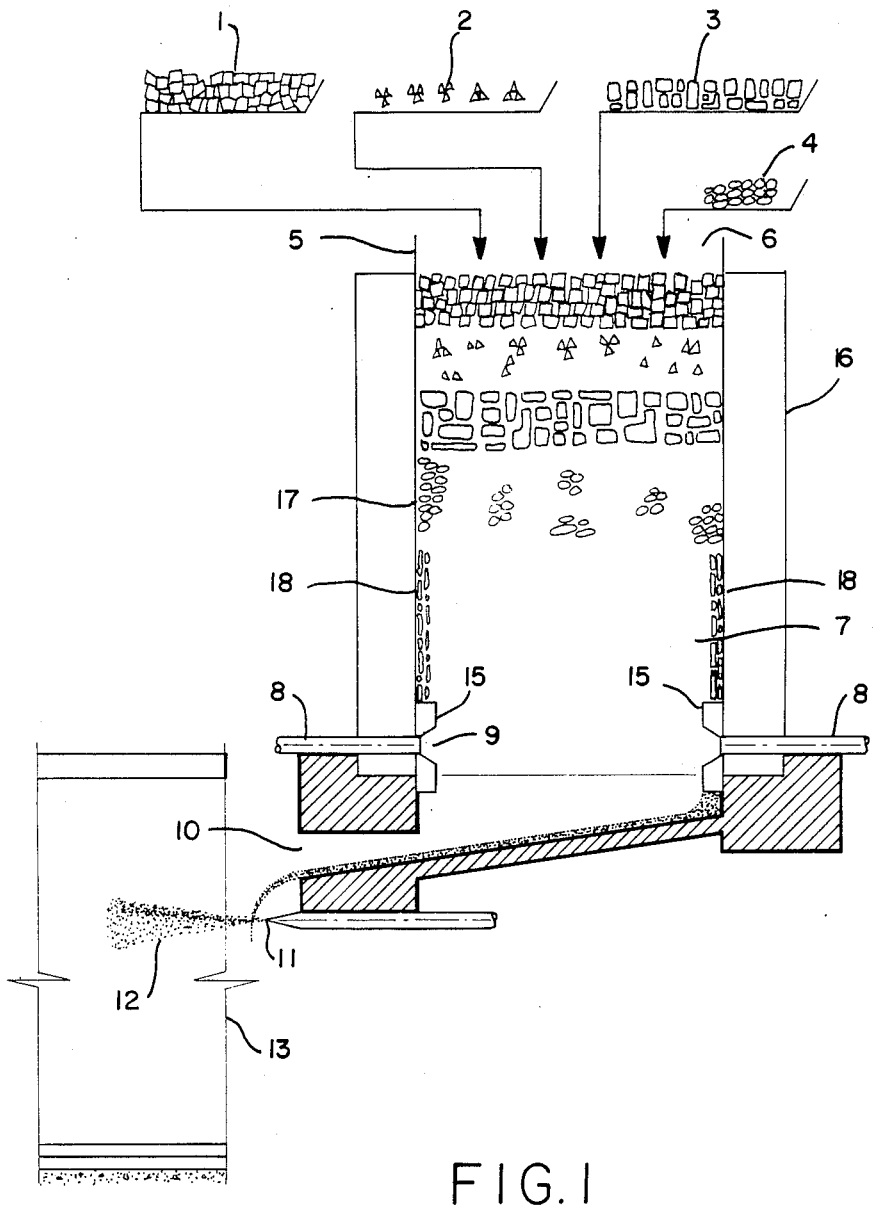
FIG. 1 is a plan view of a suitable furnace in combination with means to pass a supersonic blast of dry air through a stream of molten reaction product produced by the furnace.

FIG. 1 illustrates an embodiment of the apparatus and procedure to carry out the invention. Crushed limestone (1), silica stone (2), argillaceous stone (3), and coke or coal (4) are fed into furnace (5) through top inlet (6) and flow downwardly to melting zone (7). Air blast (8) enters through tuyeres (9) to burn coke or coal (4) and thus provide heat for fusion and reaction of raw materials.

Starting materials for the present process are the same as those conventionally employed in known cement-making processes. As is known to those skilled in the art, the relative proportions of starting materials may be varied to produce a cement having desired physical properties. For example, it is known that portland cement exists within only narrow ranges of composition in the three-phase system [$CaO$-$Al_2O_3$-$SiO_2$].

In preferred examples, the molten slag advantageously exhibits a base (calcium magnesium) to acid (silicate, aluminate, ferrite) ratio (computed on a molar basis) of between 2.3:1 to 3:1. The desired ratio is obtained by analyzing the starting materials [determining in each the total base ($CaO$, $MgO$) and acid ($SiO_2$, $Fe_2O_3$, $Al_2O_3$)] and mixing the same to obtain the desired ratio. Once fused, the slag is analyzed by conventional means to determine whether the mix is proper. This method of obtaining a desired base to acid ratio is common practice in the industry.

Hot gases flow upwardly countercurrent to raw materials, decomposing calcium carbonate and preheating solid materials. The intimate contact provides excellent heat recovery. Molten product flows continuously through outlet (10), where it meets a supersonic blast of dry air (11) which shatters the liquid stream into fine threads or fibers (12). Enclosed chamber (13), containing dry air, receives the cement fibers (12). Since the supersonic air blast and cement fibers are also present in the surrounding air, it must also be dry to prevent prehydration of the cement fibers.

Fibers (12) are then collected and shattered, e.g., in a hammermill, to a fine powder, mixed with an appropriate amount of gypsum, packed and delivered.

Figure 2:
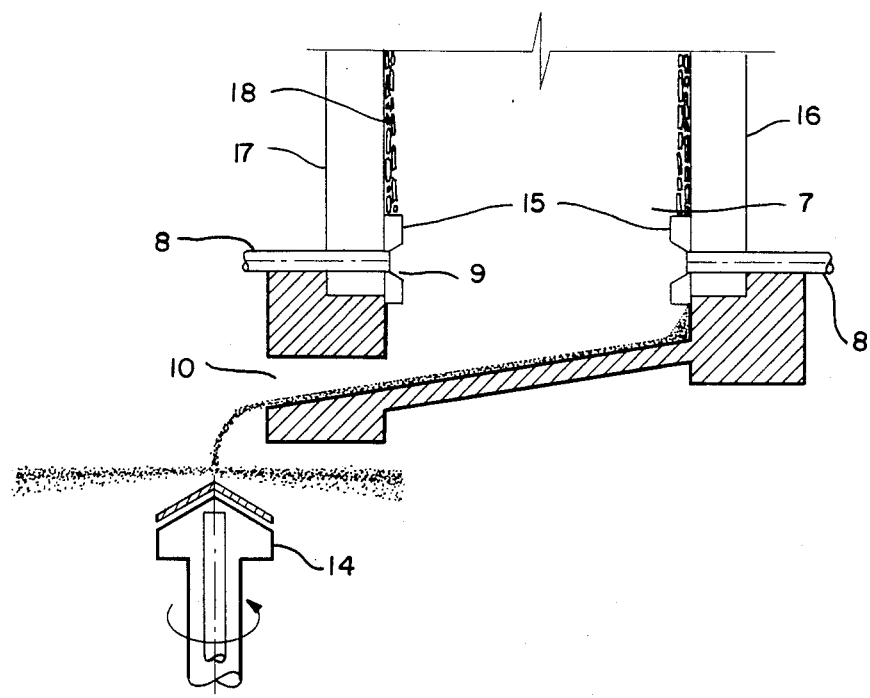
FIG. 2 is a plan view of an alternative embodiment illustrating such a furnace and stream-directing means in combination with a rotatable disk for quenching and dispersing.

FIG. 2 illustrates another embodiment of the invention. Instead of supersonic blast (11), a rotating cone (14) is used to form fibers (12). This rotating cone (14) is water cooled and is preferably covered with a graphite surface.

The supersonic air jet advantageously has an air blast velocity of from about 1.2 to about 3.5 Mach.

Although FIG. 2 shows a rotating cone (14), such can be replaced by a rotating disk having a flat surface. The disk or cone is rotatable at a peripheral velocity of from 1,300 to 3,800 feet per second.

Means for producing a supersonic air blast are not new. They are used, e.g., in apparatus for making steel. Suitable means are described in U.S. Pat. Nos. 3,201,105, 3,272,618 and 3,344,834. The jet is advantageously of the converging-diverging type. Such a configuration of jet is also similar to ones used in rock-wool production.

The bottom and sidewalls of the furnace are preferably lined up to the tuyere level with graphite (15), which is not wetted by the liquid cement. Wall (16), surrounding furnace (5), is advantageously provided with means for water-cooling inner wall (17). Liquid cement, upon freezing on wall (17), provides its own insulating refractory (18).

Molten product flowing through outlet (10) is at a temperature which ordinarily exceeds 1,660° C. When a supersonic air blast is passed through that stream, quenching is effected in milliseconds to produce fibers at a temperature less than 300° C. When a rotating disk is used, the quenching time is about ten-fold that with the air blast. Air entrainment and radiation are major cooling factors when quenching is effected with a rotating-disk system.

Melt flows at temperatures from about 1.660° C. to around 1,800° C. The rate of flow depends upon the rate of melting, which depends upon air and fuel consumed by the furnace. Although the technology appears similar to that for a blast furnace or for a rock-wool furnace, important differences exist. $C_3S$, an important constituent of high-strength cement, hydrates rapidly and, thus, the use of extremely (or "bone") dry air for quenching is preferred. Premature hydration destroys the desired cement properties and unexpectedly occurs at temperatures encountered in rock-wool ovens. Because the desired $\beta$-phase $C_2S$ crystals do not remain stable when fiber diameter exceeds 15 microns, quenching with extremely dry air is effected at supersonic speeds to insure proper fiber size.

The temperature of a suitable air blast can be calculated on the basis of adiabatic expansion from, e.g., 100 pounds per square inch and room temperature. The temperature at the point of impact is approximately the same as that of the original compressed air.

Raw materials for manufacturing cement with this system are the same as for previous systems, although a higher proportion of silica can be employed. Ranges of amounts of components are well known and vary widely, depending upon the type of cement desired.

A useful cement is produced via the present invention wherein the reaction product advantageously exhibits a ratio of base (calcium, magnesium) to acid (silicate, aluminate, ferrite) of between about 2.3:1 and 3:1. The operation of the furnace itself to obtain the liquid reaction product is known. The temperature profile inside the furnace is substantially the same as that employed in a rock-wool furnace or an iron-melting cupola. It depends on air preheat. Prior to the present invention, however, it has not been possible to produce cement in a rock wool-type furnace.

Heat recovery systems (not shown) can be used to preheat the combination air, thus increasing heat economy. Experiments have shown that a coal consumption of 30 pounds per barrel of cement can be reached in practice.

Whether coal or coke is used for heating is a matter of choice; liquid fuel injection can also be used at the tuyeres. Modern heat recovery systems are available and are optionally used to advantage.

When slag covers the outer surface of wall (17), the inner temperature of wall (17) is that of steam produced (at 10 psi, around 200° C.); the outer wall temperature depends upon wall thickness and the thickness of solidified slag on the wall.

Fibers (which can be 5 or 6 inches long or even longer) produced by this process are shattered, e.g., in a standard asbestos mill to pass 400 mesh. The resulting material is optionally mixed with gypsum to produce cement. The proportion of gypsum added is from none at all to some amount beyond 6 percent, depending upon the calcium aluminate present and the rate of setting required. This is standard practice in the cement industry. Activation with lime is not required.

The invention and its advantages are readily understood from the preceding description. It is apparent that various changes may be made in the process, in the products and in the apparatus without departing from the spirit and scope of the invention or sacrificing its material advantages. The described process, products and apparatus are merely illustrative of preferred embodiments of the invention.

What is claimed is:

1. A method of producing dicalcium silicate virtually entirely in $\beta$-phase crystalline form, which comprises:
    (a) quenching a liquid-phase reaction product of calcium oxide, silica and alumina from a temperature in excess of 1,500° C. to a temperature of less than 400° C., whereby the reaction product is solidified, and simultaneously
    (b) forming the reaction product under dry conditions into fibers having diameters which do not exceed 15 microns.

2. A method according to claim 1 for producing stabilized $\beta$-phase dicalcium silicate which comprises quenching from a temperature exceeding 1660° C. to a temperature of less than 300° C.

3. A method according to claim 1 wherein quenching is effected at supersonic speed.

4. A method according to claim 1 which comprises passing a supersonic jet of dry air through a free-falling stream of the liquid-phase reaction product.

5. A method according to claim 4 wherein the quenching is from a temperature in excess of 1660° C. to one which is less than 300° C.

6. A method according to claim 1 which comprises directing a free-falling stream of the liquid-phase reaction product onto a rotating surface.

7. A method according to claim 6 wherein the rotating surface is conical in shape and has a slant of at most 15 degrees.

8. A method according to claim 6 wherein the rotating surface has a diameter which is from 10 to 20 times that of the free-falling stream.

9. A method according to claim 6 wherein the rotating surface has a peripheral velocity of from 1300 to 3800 feet per second.

10. A method according to claim 1 wherein the reaction product has a ratio of base to acid of between about 2.3 to 1 and 3 to 1.

11. In a method of producing a cement comprising dicalcium silicate, the improvement wherein the dicalcium silicate is virtually entirely in $\beta$-phase crystalline form and is produced by a method according to claim 1.

12. A method of forming high-strength cement which comprises hydrating stabilized $\beta$-phase dicalcium silicate fiber having a diameter which does not exceed 15 microns.

* * * * *